United States Patent [19]

Stenzenberger et al.

[11] Patent Number: 4,981,934
[45] Date of Patent: Jan. 1, 1991

[54] CURABLE COMPOSITION COMPRISING BIS-IMIDE AND BIS-(ALKENYL PHENOL)

[75] Inventors: Horst Stenzenberger, Schriesheim; Peter Koenig, Wiesloch, both of Fed. Rep. of Germany

[73] Assignee: Technochemie GmbH Verfahrenstechnik, Dossenheim, Fed. Rep. of Germany

[21] Appl. No.: 395,101

[22] Filed: Aug. 17, 1989

[30] Foreign Application Priority Data

Aug. 18, 1988 [DE] Fed. Rep. of Germany ........ 3828096

[51] Int. Cl.$^5$ .......................................... C08F 222/40
[52] U.S. Cl. ..................... 526/262; 526/274; 526/279; 526/313; 528/170; 528/322
[58] Field of Search ............... 526/262, 274, 279, 313; 528/322

[56] References Cited

U.S. PATENT DOCUMENTS

| Re. 29,316 | 7/1977 | Bargain | 524/104 |
| 3,562,223 | 2/1971 | Bargain | 526/90 |
| 3,658,764 | 4/1972 | Bargain | 528/312 |
| 4,100,140 | 7/1978 | Zahir | 528/322 |
| 4,211,861 | 7/1980 | Stenzenberger | 528/322 |
| 4,303,779 | 12/1981 | Stenzenberger | 528/322 |

*Primary Examiner*—Harold D. Anderson

[57] ABSTRACT

Curable compositions, characterized in that they contain
(a) Polyimides of the general formula (I)

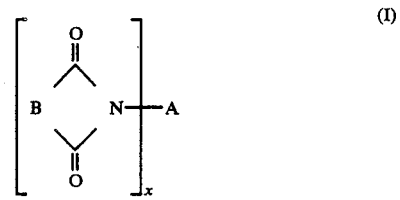

wherein B represents a divalent residue containing a carbon-carbon double bond, and wherein A represents an x-valent, however at least divalent, residue,
(b) alkenylphenols or compositions of alkenylphenols selected from
  α-α'-bis (3-alkenyl-4-hydroxyphenyl) p-diisopropylbenzene
  α-α'-bis (3-alkenyl-4-hydroxyphenyl) m-diisopropylbenzene
  2,2'-bis (3-alkenyl-4-hydroxyphenyl) perfluoropropane
  9,9'-bis (3-alkenyl-4-hydroxyphenyl) fluorene
or ethers thereof.

13 Claims, No Drawings

CURABLE COMPOSITION COMPRISING BIS-IMIDE AND BIS-(ALKENYL PHENOL)

The invention relates to curable compositions of polyimides of the general formula (I)

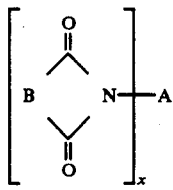

and alkenylphenols selected from

α,α'-bis (3-alkenyl-4-hydroxyphenyl) p-diisopropylbenzene

α,α'-bis (3-alkenyl-4-hydroxyphenyl) m-diisopropylbenzene 2,2-bis (3-alkenyl-4-hydroxyphenyl) perfluoropropane 9,9-bis (3-alkenyl-4-hydroxyphenyl) fluorene or ethers thereof, which are cured by heating at temperatures between 60°–260° C., preferably 100°–250° C., if necessary under pressure, and produce tough, thermally stable polymerizations.

Polyimides of the general formula (I) can be used in various ways as a raw material for the preparation of polymerization and polyadditive products. The FR-A No. 1,555 564 describes the polyaddition of N,N-bismaleimides with primary diamines and their thermal curing. In DE-B No. 2754 632.3, amino acid hydrazides are pre-reacted with N,N-bismaleimides and subsequently thermally cured. The cross-linked polymers obtained according to this patent specification show the disadvantage of many highly cross-linked duromer resins; in particular, they are very brittle.

DE-A No. 2627 045 describes a process for the preparation of cross-linked polymers displaying imide groups by reacting polyimides of type N,N'-bismaleimide with alkenylphenols and/or alkenylphenol ethers, if necessary, in the presence of polymerization catalysts. Examples of usable alkenylphenols are o,o'-diallylbisphenol-A, 4,4'-hydroxy-3,3'-allyl-diphenyl, bis (4-hydroxy-3-allylphenyl) methane, 2,2'-bis (4-hydroxyl-3,5-diallylphenyl) propane and eugenol. As a preferred embodiment, reaction products from 4,4'-bismaleimidophenyl methane and o,o'-diallylbisphenol-A are described.

The present invention was based on the problem of creating resins displaying curable imide groups which are both tough and thermally stable after polymerization.

It was discovered that reaction of polyimides of the general formula (I)

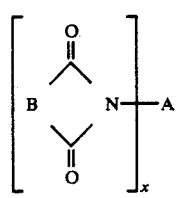

with specific alkenylphenols, i.e.

α,α'-bis (3-alkenyl-4-hydroxyphenyl) p-diisopropylbenzene

α,α'-bis (3-alkenyl-4-hydroxyphenyl) m-diisopropylbenzene 2,2-bis (3-alkenyl-4-hydroxyphenyl) perfluoropropane 9,9-bis (3-alkenyl-4-hydroxyphenyl) fluorene at temperatures between 80°–260° C., preferably 100°–240° C., provided particularly tough and simultaneously thermally stable cross-linked polyimides.

It was further discovered that toughness and thermal stability of the resins containing the curable imide groups according to the invention can be further increased if binuclear and mononuclear N,N'-bismaleimides are used as polyimide mixtures. A preferred form for use is a mixture of 4,4'-bismaleimidophenylmethane and bismaleimidotoluene. It was further discovered that the volume ratios of polyimide to alkenylphenol (alkenylphenol ether) can be varied within broad limits, but that preferably an equivalent of 0.2–1.0 of alkenylphenol is used per equivalent of polyimide.

For the polyimides usable in accordance with the invention of the general formula (I),

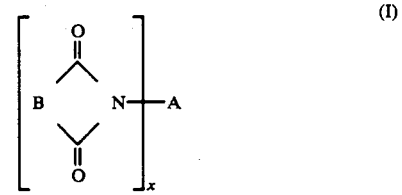

B represents a divalent organic residue which contains an ethylene double bond. The following structures are possible for the B residue.

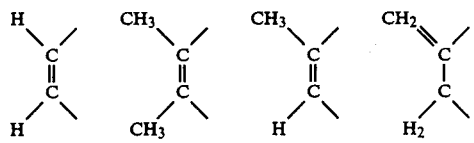

The residue designated A in the general formula (I) can be an x-valent residue, though at least a divalent residue, an alkenyl group with up to 12 carbon atoms, a cycloalkylene group with 5 to 6 carbon atoms, a heterocyclic group with 5 to 6 carbon atoms and at least one nitrogen, oxygen or sulphur atom in the ring, a mono or dicarbocyclic group or at least two mono or dicarbocyclic aromatic or cycloalkylene groups which are connected to each other by a direct carbon-carbon bond, or by a divalent ligand, i.e. oxygen, sulphur or alkylene group with one to three carbon atoms, or one of the following groups expressed as formulae, i.e.

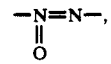

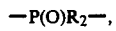

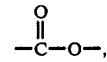

-continued

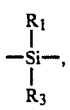

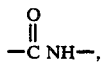

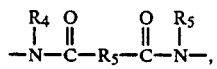

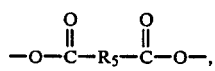

wherein the residues R₁, R₂, R₃, R₄, R₅, are alkylene groups with one to five carbon atoms.

Examples of usable bisimides for the preparation of new imide resins are 1,2-bismaleimidoethane, 1,6-bismaleimidohexane, 1,12-bismaleimidododecane, 1,6-bismaleimido-(2,2,4-trimethyl)-hexane, 1,3-bismaleimidobenzene, 1,4-bismaleimidobenzene, 4,4'-bismaleimidodiphenylmethane, 4,4'-bismaleimidodiphenyl ether, 4,4'-bismaleimidodiphenyl sulphide, 4,4'-bismaleimidodiphenyl sulphone, 3,3'-bismaleimidodiphenyl sulphone, 4,4'-bismaleimidodicyclohexylmethane, 2,4-bismaleimido toluene, 2,6-bismaleimido toluene, N,N'-m-xylylene bismaleimide, N,N'-p-xylylene bismaleimide, N,N'-m-phenylene biscitraconimide, N,N'-4,4'-diphenyl citraconimide, N,N'-4,4'-diphenylmethane bisitaconimide.

Higher molecular bisimides of the general formula (II) can also be used,

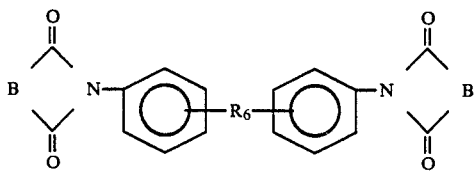

wherein R₆ represents a divalent residue of the following groups expressed as formulae, such as

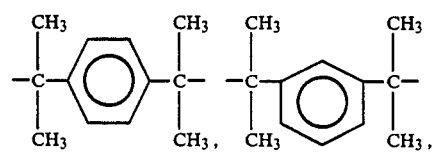

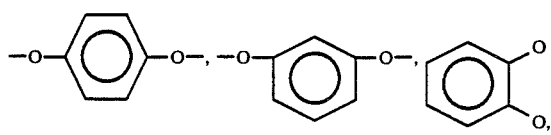

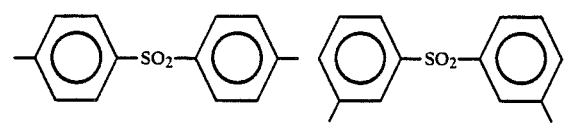

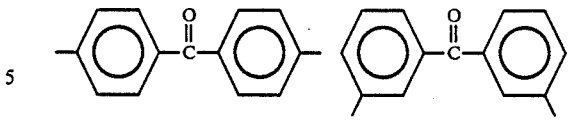

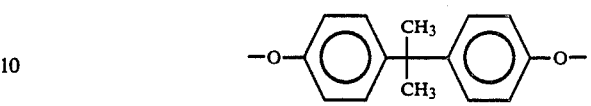

For the preparation of imide resins to be used in accordance with the invention, compositions of two or more of the bisimides mentioned can also be used. Preferable compositions of the bisimides to be used in accordance with the invention are those which produce eutectic compositions of low melting point, e.g. mixtures of 2,4-bismaleimidotoluene and 4,4'-bismaleimidodiphenylmethane or 2,4-bismaleimidoanisole and 4,4'-bismaleimidodiphenylmethane or 2,4-bismaleimidotoluene, 4,4'-bismaleimidodiphenylmethane and 2,2,4-trimethylhexamethylene bismaleimide. For the preparation of polyimides in accordance with the invention, compositions of the eutectic bisimides mentioned with higher molecular bisimides of the general formula II

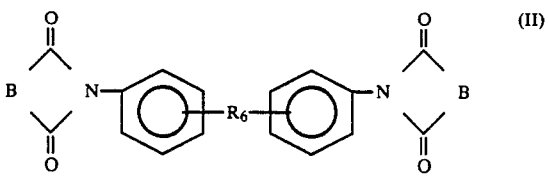

can be used.

The bisimides of the general formula can also be modified with polyamines, polyhydrazides, aminoacid hydrazides, azomethines, polyisocyanates, polycyanates and other polyfunctional monomers co-reactive with bismaleimides. Reactive elastomers, such as acryl- or vinylterminated butadiene/acrylic nitrile co-polymers or carboxyl-group terminated acrylic nitrile butadiene rubbers and butadiene rubbers can also be used for further modification of the bisimide and alkenylphenol compositions in accordance with the invention.

The compositions in accordance with the invention can also be modified with thermoplastics. e.g. polyether sulphone, polysulphone, polycarbonate, polyhydantoine, polyether imide, polyimide, polyamidimide, polyether ketones, polyetherether ketones, polyesters, polyamides and aromatic polyesters.

The preparation of the curable compositions in accordance with the invention is carried out according to the usual mixing techniques of melting, dissolving and powdering of the reactants. If further processing of the curable composition is carried out by means of the prepreg process, the reactants in the melt, if necessary in the presence of an auxiliary solution, are homogeneously mixed and the resulting melt or solution is used to impregnate fibres, fabrics, fleeces and other strengthening agents. The preparation of the mixtures of the curable compositions in accordance with the invention can also be carried out using heat, preferably at temperatures between 80° and 200° C., producing prepolymers which, depending on the duration of the thermal polymerization, produce soluble or meltable, at least mouldable, products in organic solvents.

As alkenylphenols and alkenylphenol ethers

α,α'-bis (3-allyl-4-hydroxyphenyl) p-diisopropylbenzene,
α,α'-bis (3-allyl-4-hydroxyphenyl) m-diisopropylbenzene,
α,α'-bis (3-propenyl-4-hydroxyphenyl) p-diisopropylbenzene,
α,α'-bis (3-propenyl-4-hydroxyphenyl) m-diisopropylbenzene,
2,2'-bis (3-allyl-4-hydroxyphenyl) perfluoropropane,
2,2'-bis (3-propenyl-4-hydroxyphenyl) perfluoropropane,
9,9'-bis (3-allyl-4-hydroxyphenyl) fluorene,
9,9'-bis (3-propenyl-4-hydroxyphenyl) fluorene or their ethers are used in accordance with the invention. The preparation of the allylphenols in accordance with the invention is carried out by a reaction known as thermal Claisen rearrangement, starting with the corresponding allyl ethers.

By reacting 2 mol allyl chloride with 1 mol α,α'-bis (4-hydroxyphenyl) p- or m-diisopropylbenzene, for example, the corresponding allylphenol ethers are obtained, which become α,α'-bis (3-allyl-4-hydroxyphenyl) p- or m-diisopropylbenzene by means of Claisen rearrangement at temperatures around 200° C. The corresponding α,α'-bis (3-propenyl-4-hydroxyphenyl) p- or m-diisopropylbenzenes can be produced from this by means of alkali catalyzed isomerization.

For the preparation of imide resins in accordance with the invention, compositions of two or more of the alkenylphenols or alkenylphenol ethers mentioned can be used. Good results are also obtained, in accordance with the invention, by using compositions of one or more alkenylphenols/alkenylphenol ethers in accordance with the invention with the mono and binuclear alkylphenols described in DOS 2627 045. A preferred embodiment is the use of alkenylphenols/alkenylphenol ethers in accordance with the invention mixed with o,o-diallyl-bisphenol A for preparation of the imide resins.

Polymerization catalysts can be used for many industrial applications of the curable imides according to the invention. They should be present in the reaction mixture in a concentration of 0.01 to 10 per cent by weight, preferably of 0.5 to 5 per cent by weight, in relation to the total volume of components in the reaction.

Amongst the ionic catalysts, in particular tertiary, secondary, primary amines or amines which contain various kinds of amino groups (e.g. mixed tertiary-secondary amines) and quaternary ammonia compounds are suitable in accordance with the invention. These amine catalysts can be both monoamines and polyamines. In the case of the use of primary and secondary amines, monoamines are preferable. The following substances can be listed as examples of such amine catalysts:

diethylamine, tributylamine, triethylamine, triamylamine, benzylamine, tetramethyldiaminodiphenylmethane, N,N-diisobutylaminoacetonitrile, N,N-dibutylaminoacetonitrile, heterocyclic bases, such as quinoline, N-methylpyrrolidine, imidazol, benzimidazol and their homologues, and also mercaptobenzothiazol. Examples of suitable quaternary ammonia compounds are benzyltrimethylammonia methoxide.

Further suitable ionic catalysts are alkali metal compounds, such as alkali alcoholates and alkali hydroxides. Sodium methylate is particularly well suited.

The known organic peroxides and hydroperoxides as well as azoisobutylronitrile are suitable as radical polymerization catalysts. The preferred concentration is here also 0.1 to 5.0% weight.

Further polymerization catalysts usable for the process in accordance with the invention are acetyl acetonates, in particular the acetyl acetonates of the transition metals.

The conversion of curable polyimides according to the invention into cross linked (cured) products, if necessary in the presence of a curing catalyst, is carried out by heating to temperatures of 150° to 240° C., preferably 170°-250° C. The curing is usually carried out with simultaneous shaping into forms, sheet structures, laminates, cements, etc.

Curing of the polyimides according to the invention is usually carried out with simultaneous shaping into forms, sheet structures, laminates, cements, foam materials. The usual additives in curable plastics technology, such as fillers, softeners, pigments, colourings, mould lubricants, fire-retarding substances, can be added to the curable substances. Fibreglass, mica, graphite, quartz powder, kaolin, colloidal silicon dioxide or metal powders are examples of substances which can be used as fillers. Silicone oil, various waxes, zinc stearate or calcium stearate etc. are examples of substances which can serve as mould lubricants.

Shaping can also be carried out according to the compression moulding process using a moulding press. It is usually enough to heat briefly to a temperature of 170° to 250° C. at a pressure of 1 to 200 kp/cm², and cure the form completely outside the press.

The polyimide resins in accordance with the invention can be used, in particular, in the fields of mould casting, surface protection, electrical engineering, lamination processes, glues, the production of foam materials and in the building industry.

Processing of the curable polyimide resins in accordance with the invention can be carried out by casting. For some uses it is necessary to have an especially low processing viscosity. In these cases it is possible to mix reactive thinners to the curable polyimide resins, preferably ones which are fluid at room temperature.

Usable reactive thinners contain one or more double bonds capable of polymerization of the general formula (IV)

(IV)

The usable monomers can be esters, ethers, hydrocarbons, substituted heterocyclic compounds or organometal or organometaloid compounds.

Amongst the ethers are allyl, metallyl, crotyl, isopropenyl and cinnamyl esters, derived from saturated or unsaturated aliphatic or aromatic mono or polycarboxylic acids, such as acetic acid, propionic acid, butyric acid, oxalic acid, malonic acid, succinic acid, adipic acid, sebacic acid, acrylic acid, methacrylic acid, phenylacrylic acid, crotonic acid, maleic acid, fumaric acid, citraconic acid, tetrahydrophthalic acid, itaconic acid, acetylene dicarboxylic acid, benzoic acid, phenyl acetic acid, o-phthalic acid, terephthalic acid, isophthalic acid, trimellitic acid, as well as the esters of unsaturated carboxylic acids with unpolymerizable alcohols, such as benzyl, isopropyl and 2-ethylhexyl esters. Typical examples of esters are:
allyl acetate,
methyl acrylate and methacrylate,
vinyl methacrylate,
allyl maleate,
allyl fumarate, allyl phthalate,
allyl malonate,
triallyl trimellitate and allyl trimesate.
Vinyl allyl ether, diallyl ether,
dimethallyl ether and allyl crotyl ether
can be considered as usable ethers.
Vinylpyridine, N-vinylpyrrolidone,
N-vinylcarbazol, allyl isocyanurate,
allyl cyanurate, vinyl tetrahydrofurane,
vinyl dibenzofurane,
allyloxy tetrahydrofurane and
N-allyl capropactam
can be considered as substituted heterocyclic compounds.

Hydrocarbons can also be used, such as
styrene, α-methylstyrene,
divinylbenzene, diallylbenzene or
vinyltoluene.

Of the monomer organometals and organometalloid derivates, in particular to be mentioned, are those which contain one or more phosphorus, boron or silicon atoms. They could be silanes or siloxanes, phosphines, phosphine oxides or sulphides, phosphates, phosphites, phosphonates, boranes, orthoborates, boronates, boroxols, borazols and phosphazenes. 1,3-diallyltetramethyldisiloxane, phenyldimethylallylsilane, allyldimethylphosphinoxide, allylorthophosphate, allylmethyl phosphonate, triallylborazol, triallylboroxol and triallyltrichlorophosphazene are mentioned as examples.

Furthermore, the monomers of the various aforementioned categories can contain halogen atoms, chlorine or fluorine in particular, or functional groups, such as an alcoholic or phenolic hydroxyl group, an aldehydic or ketonic carbonyl group, an amido group, an epoxy group or a cyano group.

Allyloxyethanol, p-allyloxyphenol, tetrallylepoxyethane, glycidyl acrylate, glycidyl methacrylate, allyl glycidyl ether, p-cyanostyrene, acrylamide, N-methacrylamide, N-allyl acrylamide, N-methylol acrylamide, methylacrylnitrile, p-chlorostyrene, p-fluorostyrene and β-hydroxyethyldiallyl cyanurate are mentioned as examples of polymerizable monomers which contain such substituents.

The curable compositions in accordance with the invention can also be cured in two stages. After mixing the bisimides with the alkenylphenol selected, the solution is heated to a temperature between 120°-170° C. for a limited period of time. A pre-polymerizate is formed in this way which is still thermally moldable and, if necessary, can still be dissolved in an organic solvent.

The pre-polymer can be crushed to a powder, before the final curing is carried out, if necessary after adding powdery fillers, such as quartz powder, aluminium oxide, carbon powder, etc.

The preparation of pre-polymers can also be carried out by heating a solution or suspension of the starting materials (bisimide+alkenylphenol).

In the following examples, typical curable compositions of polyimides and alkenylphenols are described and some mechanical properties measured. Modifications, any desired multiplication of the starting materials and the corresponding adjustment of technical apparatus can be easily carried out.

EXAMPLE 1

Preparation of α,α'-bis (3-allyl-4-hydroxyphenyl) p-diisopropylbenzene.

α,α'-bis (4-hydroxyphenyl p-diisopropylbenzene (467 g), sodium hydroxide (113.4 g) and 2550 ml ethanol are heated to reflux for two hours and subsequently allyl chloride (269.16 g) slowly added in drops and thereupon heated under reflux for 3 hours, subsequently 1 l ethanol distilled off, then 500 ml toluene added, subsequently 2,750 ml distilled off, the residue absorbed in 2 l toluene and the salts removed by suction. The toluene phase is washed with 500 ml water three times, then concentrated to a residue and degassed at 90° C. in a vacuum (yield of 572.1 g). The residue is mixed with 572.2 g diethylene glycol monoethyl ether and heated in nitrogen for 6 hours to 200° C., then the solvent distilled off in a vacuum and the residue degassed in a vacuum at 160° C.

Yield: 570 g. 2,2'-bis (3-allyl-4-hydroxyphenyl) perfluoropropane, α,α'-bis (3-allyl-4-hydroxyphenyl) m-diisopropylbenzene and 9,9'-bis (3-allyl-4-hydroxyphenyl) fluorene are prepared in the same way.

EXAMPLE 2

150 g of a bismaleimide mixture, comprising of 105 g 4,4'-bismaleimidodiphenylmethane and 45 g 2,4-bismaleimidotoluene, and 100 g α,α'-bis (3-allyl-4-hydroxyphenyl) p-diisopropylbenzene are melted at 140° C. in a round-bottomed flask while stirring. The melt is briefly degassed in a vacuum and poured into steel vessels and cured under pressure (4 bar) for 1 hour at 150° C., 2 hours at 180° C. and 4 hours at 210° C. After removal from the mould the resin plates are tempered for 4 hours at 240° C.

| Properties | |
|---|---|
| Bending strength at 23° C. | 160 MPa |
| Bending strength at 250° C. | 74.5 MPa |
| Bending modulus at 23° C. | 4.463 GPa |
| Bending modulus at 250° C. | 2.797 GPa |
| Breaking energy ($G_{IC}$) at 23° C. | 576.7 Joule/m$^2$ |

EXAMPLE 3

60 parts 4,4'-bismaleimidodiphenylmethane and 40 parts α,α'-bis (3-allyl-4-hydroxyphenyl) p-diisopropylbenzene are processed to pure resin plates as described in Example 1.

| Properties | |
|---|---|
| Bending strength at 23° C. | 175 MPa |
| Bending strength at 250° C. | 67 MPa |
| Bending modulus at 23° C. | 4.128 GPa |
| Bending modulus at 250° C. | 2.452 GPa |
| Breaking energy ($G_{IC}$) at 23° C. | 551 Joule/m$^2$ |

EXAMPLE 4

60 parts 4,4'-bismaleimidodiphenylmethane and 40 parts 2,2-bis (3-allyl-4-hydroxyphenyl) perfluoropropane are cast to pure resin plates and cured, as in Example 1.

| Properties | |
|---|---|
| Bending strength at 23° C. | 169 MPa |
| Bending strength at 250° C. | 70 MPa |
| Bending modulus at 23° C. | 4.225 GPa |
| Bending modulus at 250° C. | 2.374 GPa |
| Breaking energy ($G_{IC}$) at 23 °C. | 528 Joule/m$^2$ |

EXAMPLE 5

42 parts 4,4'-bismaleimidodiphenylmethane, 18 parts 2,4-bismaleimidotoluene and 40 parts 2,2'-bis (3-allyl-4-hydroxyphenyl) perfluoropropane are mixed and cast to pure resin plates, as in Example 1.

| Properties | |
|---|---|
| Bending strength at 23° C. | 123 MPa |
| Bending strength at 250° C. | 73 MPa |
| Bending modulus at 23° C. | 4.285 GPa |
| Bending modulus at 250° C. | 2.334 GPa |
| Breaking energy ($G_{IC}$) at 23 °C. | 884 Joule/m$^2$ |

EXAMPLE 6

55 parts of a bismaleimide mixture, comprising of 38.5 parts 4,4'-bismaleimidodiphenylmethane and 16.5 parts 2,4-bismaleimidotoluene, 22.5 parts α,α'-bis (3-allyl-4-hydroxyphenyl) p-diisopropylbenzene and 22.5 parts 2,2'-bis (3-allyl-4-hydroxyphenyl) propane are processed to pure resin plates, as in Example 1.

| Properties | |
|---|---|
| Bending strength at 23° C. | 168 MPa |
| Bending strength at 250° C. | 79 MPa |
| Bending modulus at 23° C. | 4.38 GPa |
| Bending modulus at 250° C. | 2.80 GPa |
| Breaking energy ($G_{IC}$) at 23° C. | 551 Joule/m$^2$ |

EXAMPLE 7

55 parts of a bismaleimide mixture, comprising of 38.5 parts 4,4'-bismaleimidodiphenylmethane and 16.5 parts 2,4-bismaleimidotoluene, and 45 parts 9,9-bis (3-allyl-4-hydroxyphenyl) fluorene are processed to pure resin plates, as in Example 1.

| Properties | |
|---|---|
| Bending strength at 23° C. | 120 MPa |
| Bending strength at 250° C. | 105 MPa |
| Bending modulus at 23° C. | 4.58 GPa |
| Bending modulus at 250° C. | 3.40 GPa |
| Breaking energy ($G_{IC}$) at 23° C. | 228 Joule/m$^2$ |

EXAMPLE 8

56 parts 4,4'-bismaleimidodiphenylmethane, 24 parts 2,4-bismaleimidotoluene, 20 parts 2,2'-bis (3-allyl-4-hydroxyphenyl) propane, 15 parts 2,2'-bis (3-allyl-4-hydroxyphenyl) perfluoropropane are processed to pure resin plates, as described in Example 1.

| Properties | |
|---|---|
| Bending strength at 23° C. | 143 MPa |
| Bending strength at 250° C. | 84 MPa |
| Bending modulus at 23° C. | 4.593 GPa |
| Bending modulus at 250° C. | 3.241 GPa |
| Breaking energy ($G_{IC}$) at 23° C. | 287 Joule/m$^2$ |

EXAMPLE 9

56 parts 4,4'-bismaleimidodiphenylmethane, 24 parts 2,4-bismaleimidotoluene, 20 parts 1,3-bisglycidylresorcin/o-allylphenol adduct (prepared as described in Example 4, UK Patent Application No. 8601201), 15 parts 2,2'-bis (3-allyl-4-hydroxyphenyl) perfluoropropane are processed to pure resin plates, as described in Example 1.

| Properties | |
|---|---|
| Bending strength at 23° C. | 147 MPa |
| Bending strength at 250° C. | 75 MPa |
| Bending modulus at 23° C. | 4.624 GPa |
| Bending modulus at 250° C. | 2.124 GPa |
| Breaking energy ($G_{IC}$) at 23 °C. | 249 Joule/m$^2$ |

EXAMPLE 10

16.8 g 3-aminobenzoic acid hydrazide is dissolved in 100 ml methylglycol acetate at 50° C. Subsequently, 134.4 g 4,4'-bismaleimidodiphenylmethane, 57 g 2,4-bismaleimidotoluene and 100 ml methyl glycol acetate are added and the mixture heated under rotation to 130° C. with simultaneous extraction of solvents, until a clear melt with a residue solvent content of 5% is obtained. At 120° C., 36 g 2,2 bis(3-allyl-4-hydroxyphenyl) perfluoropropane is added, mixed well, subsequently briefly degassed in a vacuum and cast in steel forms. Curing took place at a pressure of 4 bar for 2 hours at 170° C., 2 hours at 190° C. and 2 hours at 210° C. After removal from the mould, tempering was carried out at 240° C.

| Properties | |
|---|---|
| Density | |
| Bending strength at 23° C. | 129.7 MPa |
| Bending strength at 250° C. | 63.6 MPa |
| Bending modulus at 23° C. | 4.624 GPa |
| Bending modulus at 250° C. | 2.020 GPa |
| Breaking energy ($G_{IC}$) at 23° C. | 251 Joule/m$^2$ |

EXAMPLE 11

150 g of a bismaleimide mixture, comprising of 105 g 4,4'-bismaleimidodiphenylmethane and 45 g 2,4-bismaleimidotoluene, and 100 g α,α'-bis (3-allyl-4-hydroxyphenyl) m-diisopropylbenzene are melted at 140° C. in a round-bottomed flask while stirring. The melt is briefly degassed in a vacuum and poured into steel vessels and cured under pressure (4 bar) for 1 hour at 150° C., 2 hours at 180° C. and 4 hours at 210° C. After removal from the mould the resin plates are tempered for 4 hours at 240° C.

| Properties | |
|---|---|
| Bending strength at 23° C. | 149 MPa |
| Bending strength at 250° C. | 84 MPa |
| Bending modulus at 23° C. | 4.12 GPa |
| Bending modulus at 250° C. | 2.51 GPa |

-continued

| Properties | |
|---|---|
| Breaking energy (G$_{IC}$) at 23° C. | 371 Joule/m$^2$ |

EXAMPLE 12

150 g of a bismaleimide mixture, comprising of 100 g 4,4'-bismaleimidodiphenylmethane and 100 g α,α'-bis (3-allyl-4-hydroxyphenyl) m-diisopropylbenzene are melted at 140° C. in a round-bottomed flask while stirring. The melt is briefly degassed in a vacuum and poured into steel vessels and cured under pressure (4 bar) for 1 hour at 150° C., 2 hours at 180° C. and 4 hours at 210° C. After removal from the mould the resin plates are tempered for 4 hours at 240° C.

| Properties | |
|---|---|
| Bending strength at 23° C. | 163 MPa |
| Bending strength at 250° C. | 56 MPa |
| Bending modulus at 23° C. | 4.02 GPa |
| Bending modulus at 250 °C. | 2.04 GPa |
| Breaking energy (G$_{IC}$) at 23° C. | 553 Joule/m$^2$ |

EXAMPLE 13

150 g of a bismaleimide mixture, comprising of 105 g 4,4'-bismaleimidodiphenylmethane and 45 g 2,4-bismaleimidotoluene, and 150 g α,α'-bis (3-allyl-4-hydroxyphenyl) m-diisopropylbenzene are melted at 140° C. in a round-bottomed flask while stirring. The melt is briefly degassed in a vacuum and poured into steel vessels and cured under pressure (4 bar) for 1 hour at 150° C., 2 hours at 180° C. and 4 hours at 210° C. After removal from the mould the resin plates are tempered for 4 hours at 240° C.

| Properties | |
|---|---|
| Bending strength at 23° C. | 135 MPa |
| Bending strength at 250° C. | 30 MPa |
| Bending modulus at 23° C. | 4.224 GPa |
| Bending modulus at 250 °C. | 1.400 GPa |
| Breaking energy (G$_{IC}$) at 23 °C. | 565 Joule/m$^2$ |

We claim:

1. Curable composition containing (a) at least one polyimide of the general formula (I)

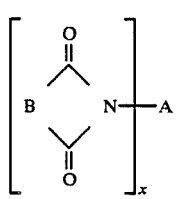

wherein B represents a divalent residue containing a carbon-carbon double bond, wherein x is 2 and wherein A represents a divalent residue, (b) at least one alkenylphenol or ether thereof, alone or in a composition, said alkenylphenol being selected from the group consisting of α-α'-bis (3-alkenyl-4-hydroxyphenyl) p-diisopropylbenzene, α-α'-bis (3-alkenyl-4-hydroxyphenyl) m-diisopropylbenzene, 2,2-bis (3-alkenyl-4-hydroxylphenyl) perfluoropropane, and 9,9'-bis (3-alkenyl-4-hydroxyphenyl) fluorene.

2. Composition according to claim 1, wherein (a) and (b) are contained in such a ratio that per polyimide equivalent, 0.05 to 20 mol alkenylphenol or alkenylphenol ether is present.

3. Compositions according to claim 1, wherein the divalent organic residue B of the general formula (I) represents a residue of the following formulae:

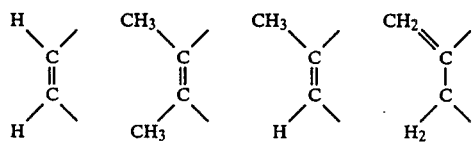

4. Composition according to claim 1, wherein the residue denoted A in the general formula (I) is an alkenyl group with up to 12 carbon atoms, a cycloalkenyl group with 5 to 6 carbon atoms, a heterocyclic group with 4 to 5 carbon atoms and at least one nitrogen, oxygen or sulphur atom in the ring, a mono- or dicarbocyclic group or at least two mono- or dicarbocyclic aromatic or cycloalkenyl groups, which are connected to each other by a direct carbon-carbon bond, or by a divalent group, selected from oxygen, sulphur, alkyls with one to three carbon atoms, or one of the following groups expressed as formulae,

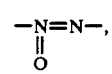

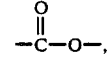

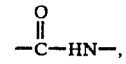

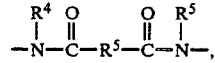

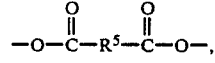

wherein the residues $R_1$, $R_2$, $R_3$, $R_4$, $R_5$ are alkyl groups with one to five carbon atoms.

5. Compositions according to claim 1, wherein the polyimide (I) is represented by the general formula (II)

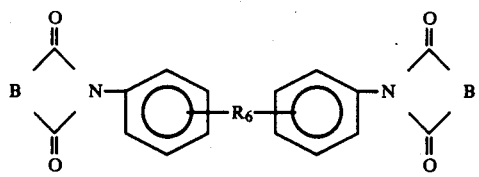

(II)

wherein $R_6$ represents a divalent residue of the following groups expressed as formulae, such as

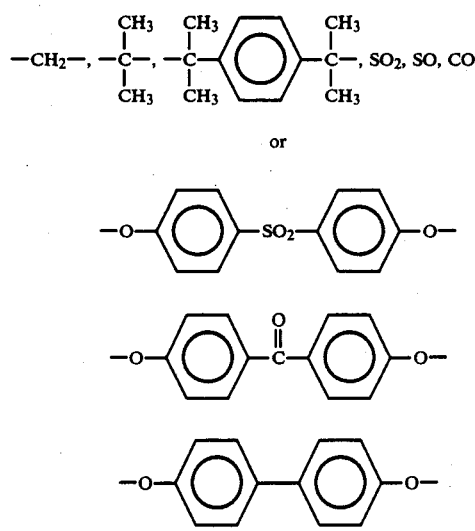

6. Compositions according to claim 1, wherein a mixture of bismaleimides of the general formula (I) is used as a polyimide.

7. Compositions according to claim 6, wherein a mixture of 4,4-bismaleimidodiphenylmethane and 2,4-bismaleimidotoluene is used as a polyimide.

8. Compositions according to claim 1, containing as alkenylphenol at least one of α,α'-bis (3-allyl-4-hydroxyphenyl) p-diisopropylbenzene α,α'-bis (3-allyl-4-hydroxyphenyl) m-diisopropylbenzene 2,2-bis (3-allyl-4-hydroxyphenyl) perfluoropropane 9,9-bis (3-allyl-4-hydroxyphenyl) fluorene alone or in a composition.

9. Composition according to claim 1, containing as alkenylphenol at least one of α,α'-bis (3-propenyl-4-hydroxyphenyl) p-diisopropylbenzene α,α'-bis (3-propenyl-4-hydroxyphenyl) m-diisopropylbenzene 2,2-bis (3-propenyl-4-hydroxyphenyl) perfluoropropane 9,9-bis (3-propenyl-4-hydroxyphenyl) fluorene alone or in a composition.

10. Composition according to claim 1, additionally containing a binuclear bond of the formula (III)

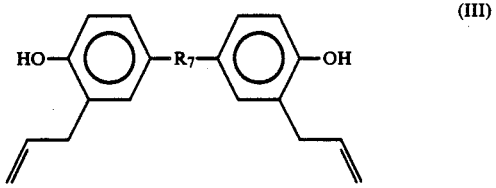

(III)

wherein $R_7$ represents one of the residues

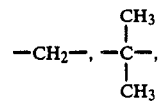

$SO_2$, SO, —S— or —O—.

11. Composition according to claim 2 wherein (a) and (b) are contained in such a ratio that per polymide equivalent, 0.2 to 1.0 mol alkenylphenol or alkenylphenol ether is present.

12. Process for the preparation of cross-linked polymers which comprises the curing of a composition according to claim 1, at temperatures of 60° to 260° C.

13. The process of claim 12 wherein the temperature range is 100°–250° C.

* * * * *